Sept. 24, 1946. T. LONGBOTHAM 2,408,148
DIAMOND CHARGED SAW BLADE AND METHOD OF MAKING SAME
Filed March 4, 1944
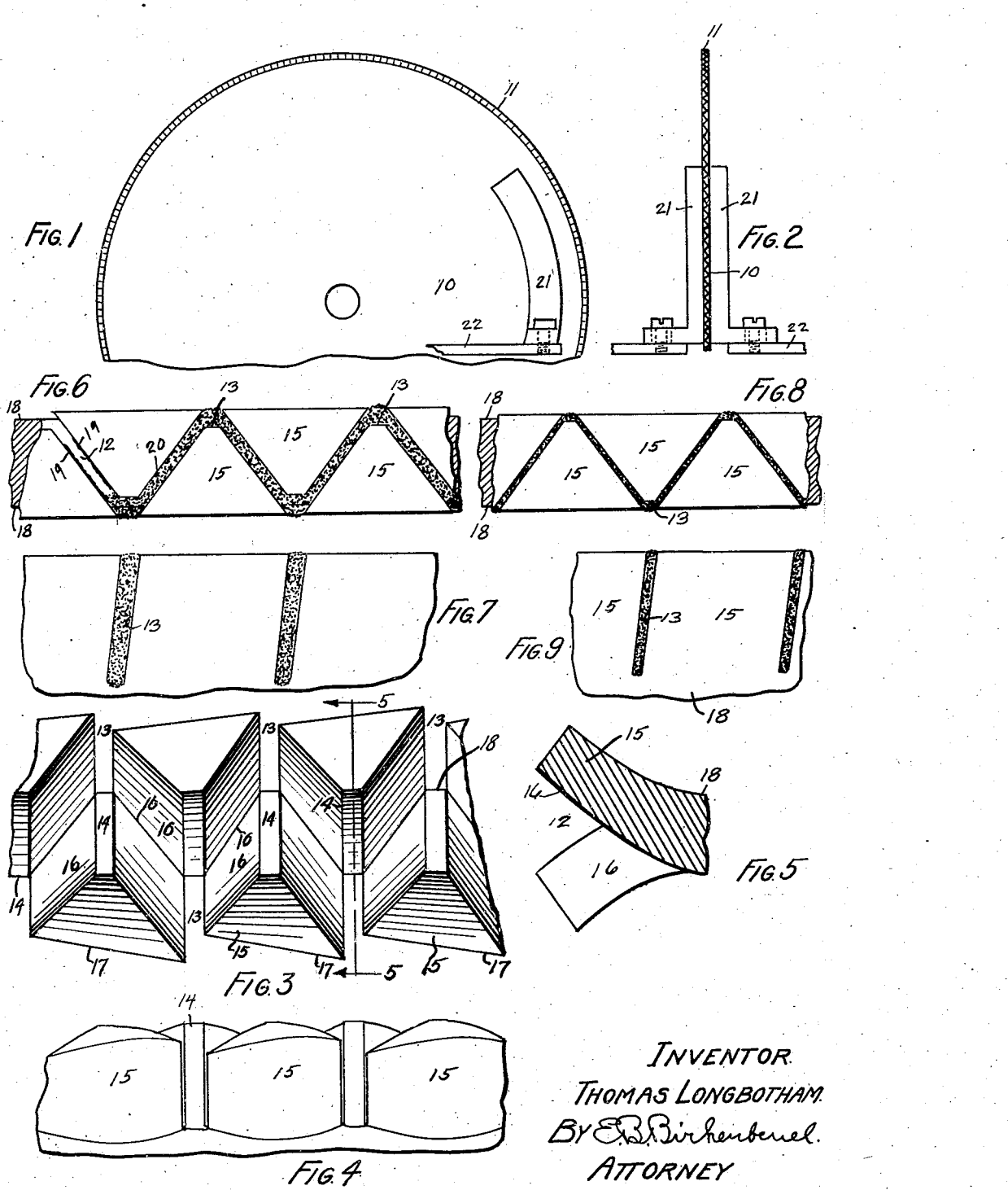
INVENTOR.
THOMAS LONGBOTHAM
BY E. B. Birkenbeuel
ATTORNEY Patented Sept. 24, 1946

2,408,148

UNITED STATES PATENT OFFICE 2,408,148

DIAMOND CHARGED SAW BLADE AND METHOD OF MAKING SAME

Thomas Longbotham, Portland, Oreg.

Application March 4, 1944, Serial No. 524,982

5 Claims. (Cl. 51—309)

This invention relates generally to the art of saw making and particularly to a diamond charged metal bonded saw blade.

The main object of this invention is to produce a saw blade of the type referred to in which the particles of diamonds are so thoroughly held within the periphery of the saw as to render it extremely difficult to become dislodged and thereby lost.

The second object is to devise a saw blade of the class described which can be economically produced and which will operate for long periods of time in difficult materials without any necessity for dressing same.

The third object is to so dispose the diamond particles in a tortuous band around the wheel perimeter in a manner that each bend of the tortuous band shall project laterally through the rim of the wheel, thereby providing a clearing cut and protecting the wheel itself against lateral wear.

A further object is to so charge a metal disc with diamond dust that the charging operation increases somewhat the thickness of the cutting portion of the blade.

A further object is to so charge a metal wheel by diagonally notching its rim that the operation can be performed with the least possible effort and without extruding the metal and that when the notches or grooves are closed after being filled with abrasive, that they actually bond the abrasives into the metal itself, not merely by trapping them in place as is the present custom, but by interlacing the abrasive in a zigzag fashion around the wheel and by allowing it to project laterally from the sides of the wheel at the notch junctions.

I accomplish these and other objects in the manner set forth in the following specification as illustrated in the accompanying drawing, in which:

Fig. 1 is a fragmentary view of a saw blade.

Fig. 2 is a fragmentary end elevation of Fig. 1.

Fig. 3 is a greatly magnified edge view of a small portion of the saw blade rim showing the uncharged tortuous curve.

Fig. 4 is a fragmentary side elevation of Fig. 3.

Fig. 5 is a fragmentary transverse section taken along the line 5—5 in Fig. 3.

Fig. 6 is a magnified view of the saw rim showing the tortuous groove charged with abrasive and partially closed.

Fig. 7 is a side elevation of Fig. 6.

Fig. 8 is a view similar to Fig. 6 showing the wheel after a final closing operation has been performed.

Fig. 9 is a side elevation of Fig. 8.

Before entering into an explanation of this invention, it is of course understood that diamond charged wheels have been in use for a long time. Various methods have been adopted for charging these wheels, but as far as is known, all of these methods have one common fault—the diamond particles are trapped into grooves or notches by an extruding action on the outer limit of the saw, and when the extruded metal is worn away, the particles of diamonds are free to escape and are not only lost, but actually serve to break down the wheel itself when the loosened particles of diamond pass through the cut between the saw and the work.

With the saw which I am about to describe, there is practically no extruding operation performed but a diagonal severing of the metal and a lateral bending resulting in the formation of what are comparable with saw teeth having a considerable "set." In addition thereto, the abrasive is caused to project through the slots formed between the teeth providing the necessary lateral cutting action.

Referring in detail to the drawing, there is shown a circular blade 10, preferably of a soft steel with a tinned surface. In the rim 11 of the blade 10 are formed the alternating diagonal slots 12, whose connecting ends terminate in the slots 13 at each side of the blade 10. The metal from the slots 13 form the lands 14 of the teeth 15, whose diagonal faces 16 form the sides of a tortuous passageway around the rim 11. Owing to the manner in which the teeth 15 are formed, there is a slight distorting action which inclines the edges 17 slightly away from the side 18 of the blade 10.

After the blade 10 is completely notched, the faces 16 and lands 14 are coated with a suitable adhesive 19, preferably of the rubber base type. The adhesive covered surfaces are now charged with diamonds 20 and the teeth 15 are given a preliminary closing movement as shown in Fig. 6. They are then finally rolled to gauge as shown in Fig. 8, causing the entrapped abrasive 20 to be imbedded in the faces 14 and 16 without any danger of their becoming dislocated and lost.

When it is remembered that diamonds do not wear out but fall out of diamond charged saw blades, it can be seen that the main difficulty with such devices has been overcome and extensive tests with these blades on the hardest types of quartz and other materials proves that they will saw faster and last longer than any known blade of the same type.

Since the blade 10 is necessarily quite thin and laterally flexible, it can be seen that the slightest irregularity on the face of the rim 11 would cause the saw blade to vibrate and "run," thereby unduly wearing the saw and retarding the cutting operation. To overcome this difficulty I provided a pair of guides 21 mounted on the brackets 22, which are preferably yielding in order that the guides 21 may firmly support the plate 10 without unnecessary wear or retarding action.

While the edges and surfaces of the parts coming in contact with the adhesive 19 and abrasive 20 are illustrated as being straight and smooth, they are actually quite rough when examined under a glass, all of which tends to improve the bonding action occasioned by the hard diamond particles being pressed between the relatively soft metal surfaces 16.

It will be understood that the exact angle of the faces 16 as well as the size of the lands 14 is not important, but can be varied considerably without departing from the spirit of this invention.

Although the land 14 has been shown to an appreciable size, in actual practice it is made very small, the purpose being to leave only a narrow slit through which the confined diamond may project and by means of which it is held against escape.

It can be readily seen that by making the line of abrasives in the form of a tortuous band, I have not only improved the bonding action but I have greatly increased the amount of abrasive with which a given wheel can be charged, thereby increasing the cutting action and adding to the life of the saw itself.

Saws of this type need not be dressed at all, but may be used indefinitely or until the entire diamond bearing portion thereof is worn away, without any attention. In fact, they seem to cut smoother and faster after having been in use a considerable period of time.

While I have thus illustrated and described my invention, it is not my desire to be limited to this precise form, but I do intend to cover all such forms and modifications thereof as fall fairly within the appended claims.

I claim:

1. A diamond charged saw blade consisting of a disc of soft steel having a plurality of diagonal slots formed about the periphery thereof constituting a continuous zig zag groove, the reversing bends of which extend to the lateral faces of the disc, said groove being filled with diamond particles which extend laterally from the sides of the disc and radially from the groove.

2. A diamond charged saw blade consisting of a disc of soft steel having a plurality of laterally inclined slots formed therein, the ends of which join to form a zig zag passageway, said connecting ends opening through the sides of the wheel, said groove and lateral openings being charged with diamonds, the diamond bearing portion of the blade having a greater thickness than does the lateral of the blade.

3. A method of making diamond charged saw blades consisting of notching the edge of said blade diagonally with relation to its axis of rotation, succeeding notches being in opposite directions, the junctions of each pair of notches extending through the sides of the blade at the rim thereof, then coating the internal face of the groove with an adhesive, then depositing diamonds in said adhesive, then compressing the sides of said groove upon said diamonds.

4. A method of charging saw blades with diamonds, consisting of forming a tortuous broken groove in the periphery of a disc by spreading the material therein diagonally along its edges, forming openings in the side of the disc joining with the groove at its bends, then coating the walls of the groove with a rubber cement, then depositing diamond dust in the cement, then removing any diamonds not adhering to the adhesive, then closing the groove walls to confine the diamonds therein.

5. A method of making diamond charged saw blades consisting of progressively forming a disc of soft steel, slitting the periphery of the wheel diagonally in alternate directions to form a zig zag groove around the blade in a manner to cause the inner side of said groove to flare outwardly, then coating the interior of said groove with adhesive, then charging the adhesive with diamonds, then closing the walls of said grooves upon said diamonds, then compressing the diamond bearing portion of the blade.

THOMAS LONGBOTHAM.